(12) United States Patent
Plattner et al.

(10) Patent No.: US 9,911,004 B2
(45) Date of Patent: Mar. 6, 2018

(54) CLOUD-BASED HARDWARE ARCHITECTURE

(71) Applicant: Hasso Plattner Institut fuer Softwaresystemtechnik GmbH, Potsdam (DE)

(72) Inventors: Hasso Plattner, Schriesheim (DE); Matthieu Schapranow, Berlin (DE)

(73) Assignee: Hasso Plattner Institut fuer Softwaresystemtechnik GmbH, Potsdam (DE)

( * ) Notice: Subject to any disclaimer, the term of this patent is extended or adjusted under 35 U.S.C. 154(b) by 199 days.

(21) Appl. No.: 14/954,027

(22) Filed: Nov. 30, 2015

(65) Prior Publication Data

US 2016/0239681 A1    Aug. 18, 2016

Related U.S. Application Data

(60) Provisional application No. 62/115,840, filed on Feb. 13, 2015.

(51) Int. Cl.
*G06F 21/62* (2013.01)
*H04L 29/08* (2006.01)
(Continued)

(52) U.S. Cl.
CPC .... *G06F 21/6245* (2013.01); *G06F 17/30566* (2013.01); *H04L 41/0813* (2013.01);
(Continued)

(58) Field of Classification Search
CPC ............... G06F 9/547–9/548; G06F 17/30557–17/30569; G06F 21/604;
(Continued)

(56) References Cited

U.S. PATENT DOCUMENTS

2002/0095454 A1* 7/2002 Reed .................. G06Q 30/0601
709/201
2013/0110963 A1* 5/2013 Han ........................ H04L 67/42
709/213

(Continued)

*Primary Examiner* — Kevin Bechtel
(74) *Attorney, Agent, or Firm* — Caesar Rivise, PC

(57) ABSTRACT

A federated in-memory database system (FIMDB) and a method for operating the same. The system comprises: A plurality of interconnected computing sites (LS), each installed with a local in-memory database instance, which is configured to connect to a FIMDB landscape instance; central computing infrastructure, provided by a service provider (SP), which grants access to algorithms managed by the service provider (SP) for execution on local data of the respective consuming computing site (LS); one or more communication channels ($LSG_1$, $LSG_2$), which are specifically adapted for connecting local and remote computing hard- and software via a digital communication channel; and configuration adjuster (CM), which are specifically adapted for configuring local hard- and software to connect to the FIMDB system (FIMDB) and for configuring local hard- and software in order to access algorithms managed by the service provider (SP) and execute them on the local computing hardware.

24 Claims, 10 Drawing Sheets

(51) Int. Cl.
*H04L 12/24* (2006.01)
*G06F 17/30* (2006.01)
*G06F 9/50* (2006.01)

(52) U.S. Cl.
CPC .............. *H04L 67/02* (2013.01); *H04L 67/10* (2013.01); *G06F 9/5027* (2013.01)

(58) Field of Classification Search
CPC ............ G06F 21/6245; H04L 41/0813; H04L 67/02–67/025; H04L 67/10; H04L 67/16; H04L 67/34; H04L 67/40; H04L 67/42
See application file for complete search history.

(56) References Cited

U.S. PATENT DOCUMENTS

2016/0232306 A1* 8/2016 Achan .................... G06Q 50/22
2017/0177849 A1* 6/2017 Farraro .................. G06F 21/35

* cited by examiner

CLOUD-BASED HARDWARE ARCHITECTURE

This application claims priority to U.S. application 62/115,840 which is hereby incorporated by reference in its entirety.

FIELD OF THE INVENTION

The present invention relates to a cloud-based architecture for processing application data in a distributed environment.

Today, cloud computing has become a synonym for elastic provision of shared computing resources operated by a professional service provider. Data processing involves the transfer from local systems to the shared resources consuming a significant amount of time when dealing with big data, which makes it inappropriate for many business purposes, such as dealing with sensitive data in context of life sciences or other application domains, where ist is required that data have to reside on the local premises.

Cloud computing has been an emerging trend in information technology in the recent years, which abstracts computing power from physical hardware. Entities with limited or no physical hardware were early adapters of cloud computing, e.g. private households and Small and Mid-size Enterprises (SMEs) [1]. However, large companies and research facilities are reservedly moving their core business processes towards cloud computing environments due to legal regulations and various concerns although they would benefit equally from advantages, such as consolidation of hardware and improved use of available resources [2].

DESCRIPTION OF THE RELATED ART

In the following, selected state-of-the-art cloud service approaches and their applicability to implement data sharing are described and compared. A central aspect is the sharing of data since it typically involves the creation of isolated copied data artifacts, which results in potentially problematic issues, such as synchronization conflicts and data redundancy.

A first architecture relates to local systems, which are interconnected via multiple cloud service providers, as depicted in FIG. 1. Sharing data from a local system, such as a Hospital Information System (HIS), via a single cloud service involves individual cloud service providers per local site as depicted in FIG. 1. The local site A is using cloud provider A while the local site B is using cloud provider B. Thus, it requires the synchronization between individual local sites and their cloud service provider as well as between multiple cloud service providers.

A second architecture relates to local systems, which are interconnected via a single cloud service provider. This scenario is depicted in FIG. 2. In comparison to the configuration of above, described in relation to FIG. 1, cloud service providers are consolidated and all local sites use a single provider. This approach involves regular data synchronization between local sites A, B, and the shared cloud storage of the cloud provider. Thus, it involves regular data ex- and import from local systems, which results in duplication of data stored at the initial local site A and B. Furthermore, it may result in conflicting changes and the need for manual, time-consuming reviewing. Thus, this scenario is usually in place when you need to rely on locally installed software at various sites, which provides ex- and importing functionality to share data. It can be considered as a first transition towards a cloud-based software deployment model [4].

A third architecture relates to cloud-based software of different cloud providers, which is depicted in FIG. 3. Sharing data between cloud applications of different cloud providers involves similar data synchronization requirements as described for the local case, described above with reference to FIG. 2. In FIG. 3 two local sites A and B are interconnected via their individual cloud providers. In the given configuration, cloud providers also host individual cloud applications. Data synchronization is performed transparently from the local user mainly between cloud service centers of individual providers using high-speed interconnections. Due to higher network bandwidth, data exchange requires less time than data exchanged between cloud provider and local site. This approach offers full flexibility in terms of incorporated cloud software and local IT optimization. However, it requires high-speed interconnections between cloud providers and still involves data duplication.

A fourth approach relates to cloud-based software of the same cloud provider, which is illustrated in FIG. 4. Particularly, FIG. 4 depicts two sites A and B using a hosted application provided by the same cloud provider. Sharing data within the same cloud-based application removes any of the time-consuming data ex- and import procedures. However, this approach still requires the upload/import of data once from any of the using local sites via the network connection from the local site to the cloud provider. Since this approach eliminates the need for data synchronization, it also eliminates the need to handle eventual synchronization conflicts. As a result, it requires only a single data transfer from all participating local sites to the cloud service provider.

Generally, in the figures, the reference numeral "R" represents a request, made by a requester and which is directed to a computer system at which the appended arrow is directed.

Based on this state of the art, it is an object of the present invention to use the benefits of a classic decentralized cloud-based architecture for computing resources, e.g. efficient use of hardware resources and managed software, while keeping sensitive data, e.g. patient data, local and eliminating the need to transfer (sensitive) data from locals nodes (or sites) to the cloud.

This object is achieved with the appending claims, in particular with a system and method for operating a federated in-memory database.

SUMMARY

According to a first aspect the present invention refers to a Federated In-Memory Database computing system (in the following abbreviated as FIMDB system) with:

- A plurality of interconnected computing nodes, each installed with a local database instance, in particular with a local In-Memory Database (IMDB) instance, which is configured to connect to the FIMDB system and in particular to a central computing infrastructure
- The central computing infrastructure, provided by a service provider, who grants access to services, managed by the service provider for execution on local data of the respective computing node
- One or more communication channels for connecting local and remote computing nodes Configuration adjusters for configuring local hard- and software in order to access services, managed by the service provider.

According to an embodiment the algorithms, programs, services, etc. may be executed on the local computing node or hardware and/or on hardware or nodes, provided by the service provider.

Generally, there exist at least two types of nodes:
1. Consuming nodes. This is a local computing node, which consumes services provided by a service provider. Typically, the consuming computing node and the local computing node are identical. In an alternative embodiment the computing node may be a superordinate computing infrastructure, which hosts and manages several local nodes.
2. Central computing nodes. The service provider provides managed services to a plurality of distributed local consuming nodes using the central computing node. The service provider is remote from the consuming nodes and not on-premise with respect to the consuming nodes or sites. Central computing nodes may also be used for data processing, e.g. if the consuming party requires additional resource when scaling out.

The term computing "node" refers to or equals a computing site. A computing site or node is a technical system for processing data with respective physical resources (including memory, Central Processing Units (CPUs), network connections, bandwidth, operating systems, algorithms, etc.). It may be a single computer, blade, or a computer network or a virtualized computing infrastructure with one or more processing cores and with interfaces for data exchange. A consuming computer node is a computer node, which consumes or uses or applies managed services (offered by the remote service provider).

The service provider grants local nodes access to managed services on the central computing infrastructure or between two or more local computing sites (which are also referred to as computing site in contrast to the central service provider with his infrastructure) so that sensitive data of the respective local computing node is stored and processed only locally and node-specific sensitive data does not leave the local computing node, whereas sharable master data is processed and managed centrally by the service provider. The service provider is adapted to provide a set of managed services, amongst others, but not limited to the field of bioinformatics and in particular for processing and analysis of genome data, big medical data, and sensitive patient data. In this embodiment managed services may include, amongst others, but not limited to algorithms for performing alignment of genome data, and variant calling, and analysis of genetic variants with reference to US20140214334 A1 and US20140214333 A1. In other embodiments the managed services may be in other technical fields, amongst others, but not limited to workflow management, process automation, industry 4.0 scenarios, etc.

The term "federated" database reflect the fact that there are a plurality of database instances are installed and configured on computing nodes and on the service provider that are interconnected. A set of interconnected local IMDB instances (shortly: IMDB) is to be construed as a federated in memory database (shortly: FIMDB) when they form a single IMDB instance from the user's point of view whilst the concrete physical location of data remains transparent during query processing.

A local IMDB instance is to be construed as an IMDB database system, which may consist of one or more physical database servers, used for local database operations only. A local IMDB instance does not have any interconnection to further database systems. A database is to be construed as a single or multiple database instances forming one logical database, i.e. sharing a common set of data, processes, and functions. A federated in memory database instance is such a database instance which is interconnected to further database system(s) or to the central computing system of the service provider. Typically, several local IMDB instances are physically located at individual local sites and are interconnected to the local IMDB instance of the (central) service provider. All instances form together the federated in memory dataset system according to the invention.

Existing cloud provisioning models build on a high bandwidth for interconnecting local sites and hardware resources provided by the service provider. In contrast, the given FIMDB approach moves only comparable small amounts of data, i.e. binaries, algorithms, etc., from the service provider to the connected local sites for execution. As a result, such a hybrid cloud provisioning model is also adequate for limited bandwidth between local sites and the service provider.

The term "central computing infrastructure" refers to the fact that a single computing infrastructure is provided, which is managed and operated by the service provider. The central computing infrastructure is used to interconnect local IMDB instances to the FIMDB. Algorithms, programs, services, etc. managed by the service provider are provided via the central computing may be executed on the local computing infrastructure. "Local computing infrastructures" refers to the existing computing infrastrucutres on local sites operated by site-specific personnel.

The term "services" or managed services includes algorithms, computer programs, portions of computer programs, routines etc. Services can either by provided via the directory, e.g. as file, binary, program, etc., or via the FIMDB system, e.g. stored database procedure, database tables, etc.

One or more communication channels, such as a network connection, includes WLAN, LAN, or other types of network interconnections. In particular, the connection means is a secured end-to-end communication channel, e.g. a Virtual Private Network (VPN) connection, established via a publicly available digital communication network, such as the Internet, to securely exchange data using a low-cost, omnipresent communication infrastructure.

The configuration adjuster is adapted to configure both the services directory as well as the IMDB instance. Typically, all computing nodes (local and central) of the federated in memory-database computing system comprise at least one database (instance) and a file directory (or file system). For that, the configuration adjuster adjusts the configuration of a local IMDB instance to connect to the FIMDB. Furthermore, it provides for the configuration of a remote service directory, exposed by the service provider, and automatically mounting the remote service directory to all local computing nodes. It further includes the configuration of local application settings for all or selected applications on the local computing node, e.g. to use master data provided by the service provider SP for locally executed algorithms. The configuration means may further be adapted to configure user accounts and access groups. These kind of configurations need to be executed only once. The configuration adjuster may further be adapted to configure the local services directory exposed by the managed services provider, which contains all algorithms managed by the service provider for execution on local data. It may further consist of configuring the subscribed managed services at the local computing node for use by local users. Preferably, the configuration is executed by means of an installation file and may be executed on the local site and/or by means of the support of the service provider.

The service provider is adapted to provide managed services. The managed services are, thus, special services, such as specific algorithms, programs, database procedures, services, etc., which are managed by a central service provider and provided to local computing infrastructures.

Instances of the in-memory database are installed on the local and central computing infrastructure.

According to a preferred embodiment the FIMDB nodes (in particular the local nodes and the central service provider node) comprise multiple computing nodes, including local computing nodes of the local sites as well as the computing nodes of the central computing infrastructure of the service provider. Preferably, the infrastructure comprises multiple computing nodes as well. Typically, the local in-memory database instance is installed and configured on each local node to connect to the FIMDB system.

According to another aspect of the present invention the database system is a distributed database and in particular an SAP HANA in-memory database.

Moreover, the invention refers to a service provider, who operates the federated in-memory database computing system as described above.

The invention also refers to a federated in-memory database computing system.

Moreover, the invention refers to a method for operating a federated in-memory database computing system (in the following abbreviated as FIMDB system), comprising the following steps:
- Providing a plurality of local computing nodes, who consume services
- Providing a central computing infrastructure by a service provider, who manages services to be consumed by the local computing nodes
- Connecting the local computing nodes among each other and to the central computing infrastructure (and thus enabling data exchange)
- Configuring a remote service directory, exposed by the service provider, and automatically mounting the remote service directory to all local computing nodes
- Installing local in-memory database instances and joining them to the FIMDB system
- Subscribing to at least one of the managed services of the services provider
- Configuring the subscribed managed services at the local computing node for use by local users
- Granting access to algorithms of the managed services, to be executed on the local computing nodes so that sensitive data of the local computing node is processed locally and does not leave the local computing node.

The invention further refers to a method for providing a federated in-memory database computing system. This method focuses on the installation processes and the set up of the system.

The invention further refers to a method for operating a federated in-memory database computing system. This method focuses on the actual processing of data with the federated in-memory database computing system.

According to an aspect of the present invention, accessing a (subscribed) managed service may incorporate the use of a hyperlink to access a web application (provided by the service provider) by local users on the local computing node. Preferably, the managed service is subscribed.

According to another aspect of the present invention, the service provider provides managed services on behalf of the different local computing nodes so that sensitive data of the respective local computing node is only processed locally and node-specific sensitive data does not leave the local computing node, whereas data that is not classified as sensitive data, i.e. sharable master data, is processed and managed on the central computing infrastructure of the service provider.

According to another aspect of the present invention, required software, including algorithms, selected application data, e.g. master data and processes for processing data, are downloaded from a service directory managed by the service provider so that the software is directly executed by an operating system of the local computing node.

According to another aspect of the present invention, required software, including algorithms, selected application data, e.g. master data and processes for processing data including algorithms and processes for processing data, is acquired by the installed local database instance from the FIMDB.

According to another aspect of the present invention, local nodes can grant access to local sensitive data for specifically selected other nodes, participating in the FIMDB.

According to another aspect of the present invention, remote nodes granted access to local data can provide algorithms and processes for processing data on the data locally without duplicating, replicating, moving or copying data to the remote node.

According to another aspect of the present invention, any access to local data is permanently and safely documented to form a complete history of exposed data items for processing with reference to EP2667337 A3.

In general, the invention refers to a Federated In-Memory Database (in the following, shortly: FIMDB) computing platform. It enables a unique hybrid cloud approach eliminating the need for transferring data to centralized cloud infrastructure. The proposed solution considers specific requirements of large enterprises and research facilities, which are bound to security regulations and must not transfer the data in a public cloud. Life science applications are one example, i.e. data processing and analysis of Next-Generation Sequencing (NGS) data. The architecture of the invention enables the provision of managed cloud services while storing sensitive data on local, on-premise computing resources using an FIMDB. Thus, algorithms are moved instead of data. Only a single source of data is maintained, eliminating any duplication through data copying, and incorporate existing, local on-premise computing resources for data processing.

The FIMDB system eliminates redundancy and the need for synchronization of changes by acting as a single source of data where all operations are performed on. The following table compares individual cloud setups and the involved amount of data duplication respectively data transfer. Compared to all other setups, the FIMDB approach according to the invention does not require any upload of data, which is shown in the application scenario described in the detailed description below.

In particular, the following table is a comparison of cloud setups, involved process steps for sharing data between two local systems, and involved data transmission between state of the art systems, as described with respect to FIGS. 1 to 4 and the present invention referred to as FIMDB, wherein "Y" represents "Yes" and "N" represents "No":

| Description | FIG. 1 | FIG. 2 | FIG. 3 | FIG. 4 | FIMDB |
|---|---|---|---|---|---|
| Export data from local system at node A | Y | Y | N | N | N |
| Upload local data to shared cloud storage or cloud app resp. | Y | Y | Y | Y | N |
| Sync data between shared cloud services or cloud apps resp. | Y | N | Y | N | N |
| Sync data from cloud service B to local node B | Y | Y | N | N | N |
| Import local data at node B to local system B | Y | Y | N | N | N |

The unique cloud setup is a setup, integrating decentralized computing resources to form a federated in-memory database system, which is based, but not limited, to the preferred embodiment of concrete requirements in the area of life sciences research. The approach combines existing advantages of cloud computing, e.g. efficient use of hardware resources and managed software, with keeping sensitive data, e.g. patient data, local while eliminating data transfers.

Further, the invention is based on a hybrid cloud computing approach, bridging the gap between the provision of managed cloud applications and data that resides on local private or on-premise computing resources. Thus, both, physical resources of the service provider (accessible via the cloud) as well as physical resources of the local nodes can be incorporated for data processing. The need for such scenarios is driven by legal requirements that do not allow the exchange of sensitive data, e.g. patient data, and the sheer volume of data, e.g. NGS data, which requires a significant amount of time for data transfer to centralized computing resources prior to its processing. In the hybrid cloud approach, also local on-premise computing resources are used for data processing. The hybrid approach focuses on the integration of on-premise computing resources. Thus, it allows migrating large enterprises and research facilities towards cloud services without losing their existing investment in hardware. Furthermore, the hybrid approach enables the use of additional computing resources either from the service provider or other local nodes connected to the service provider, e.g. to provide scalability of computing resources. However, according to the invention, the flexible hybrid cloud approach, as explained above, is extended by keeping data on local on-premise infrastructure components whilst enabling provision of applications managed by a cloud service provider. All other infrastructure components may reside either locally or remotely or both locally and remotely comparable to the hybrid cloud approach.

In the following table physical locations of selected infrastructure components per cloud category are compared.

| Component | Public | Private | Hybrid | FIMDB |
|---|---|---|---|---|
| Applications | R | L | L/R | L + R |
| Data | R | L | L/R | L |
| Runtime Environment | R | L | L/R | L + R |
| Middleware | R | L | L/R | L + R |
| Operating System | R | L | L/R | L + R |
| Virtualization | R | L | L/R | L + R |
| Physical Servers | R | L | L/R | L + R |
| Storage Subsystem | R | L | L/R | L + R |
| Network | R | L | L/R | L + R |
| Infrastructure | R | L | L/R | L + R |

This table reflects locations of selected IT system components per cloud category, wherein "L" means "Local, on premise", "R" stands for "Remote, off premise", the sign "/" stands for "Either/or local or remote" and the sign "+" means "local and remote".

There do exist several service models, like Software as a Service (SaaS), Platform as a Service (PaaS), and Infrastructure as a Service (IaaS). These service models differentiate between levels of control of the service consumer and the service provider. The present invention focuses on the service model SaaS since it is believed that a high adoption of managed services is beneficial for consumers of complex application, such as the life science use case described in the detailed description of the embodiments below to reduce costs for operation and maintenance of NGS data processing.

Depending on the service model (SaaS, PaaS and IaaS, in the FIMDB architecture) physical computing resources and its access may be distributed differently. In correspondence with SaaS, PaaS and IaaS, in the FIMDB architecture of the present invention the client has access to applications provided by the service provider. In correspondence with PaaS and IaaS and opposed to SaaS, in the FIMDB architecture of the present invention the client can deploy own applications. In correspondence with IaaS and opposed to SaaS and PaaS, in the FIMDB architecture of the present invention the client has access to storage networks, processing and other fundamental computing resources.

According to another embodiment, any access to local data is permanently documented to form a complete history of exposed data items for data processing. In an embodiment, data processing may be executed with reference to EP 2667337 A3.

According to another aspect the invention further refers to a computer program product for operating a federated in-memory database computing system, wherein the computer program product comprises a computer readable storage medium having program instructions embodied therewith, the program instructions executable by a processor to cause operations, the operations comprising:

Providing a plurality of multiple local computing nodes

Providing managed services by a service provider to be consumed by the local computing nodes Connecting the local computing nodes to the service provider and thus enabling connecting the local computing nodes to among each other interchange data with each other's as well Configuring a remote service directory, exposed by the service provider, and automatically mounting the remote service directory to all local computing nodes Installing and configuring local in-memory database instances and joining them to the FIMDB system Subscribing to at least one of the service provider's managed services Configuring the subscribed managed services at the local computing node for use by local users Granting access to algorithms of the managed services, to be executed on the local computing nodes so that sensitive data of the local computing node is processed locally and does not leave the local computing node.

According to another aspect, the present invention refers to a computer program for executing the above-mentioned steps in a computer processor. The computer program may be distributed on several computing instances and database instances of the FIMDB.

DETAILED DESCRIPTION

Figure 1:
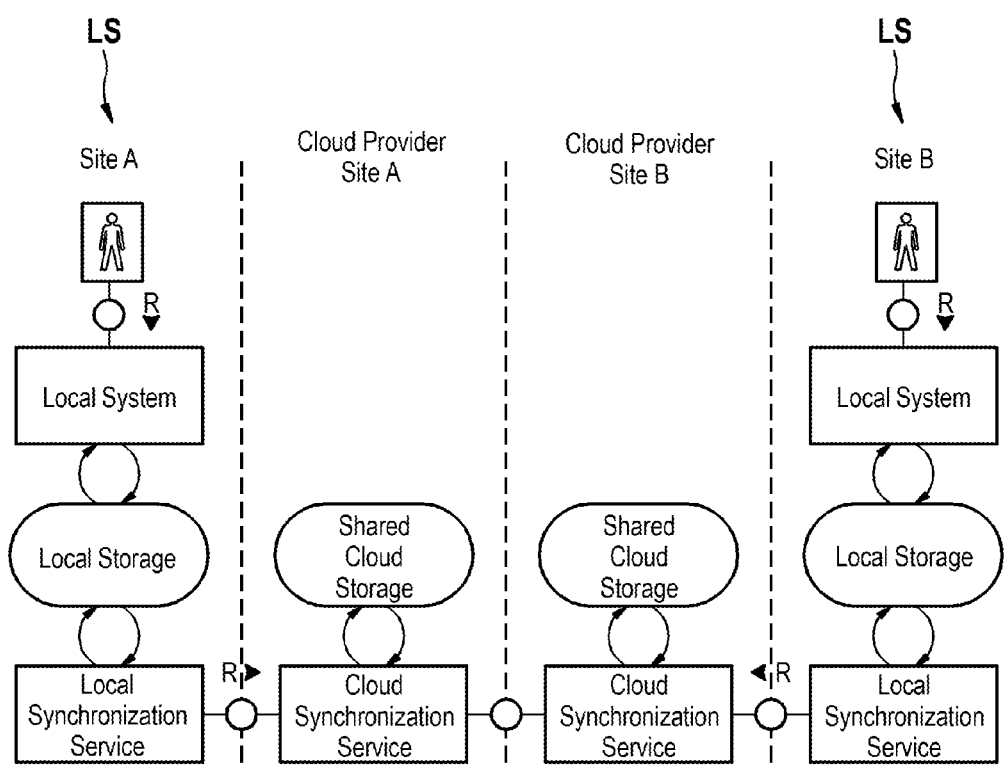
FIG. 1 shows a state of the art database system with multiple sites interconnected via individual cloud providers.
Figure 2:
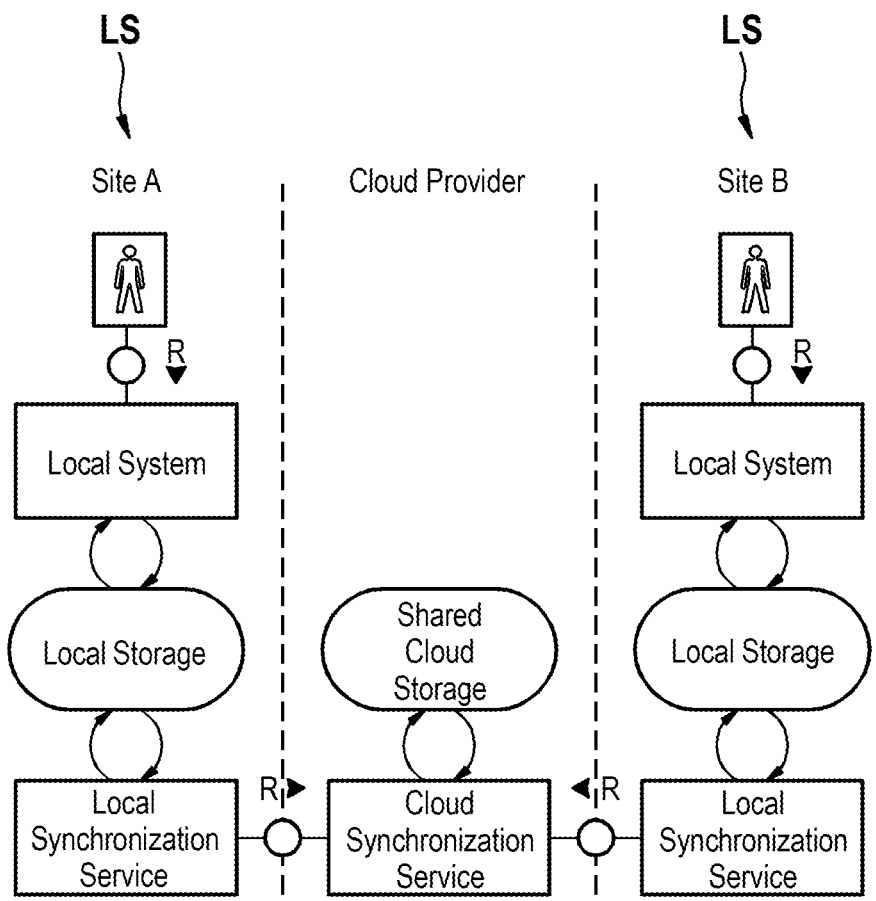
FIG. 2 is a state of the art database system with a single cloud service provider interconnecting two local sites.
Figure 3:
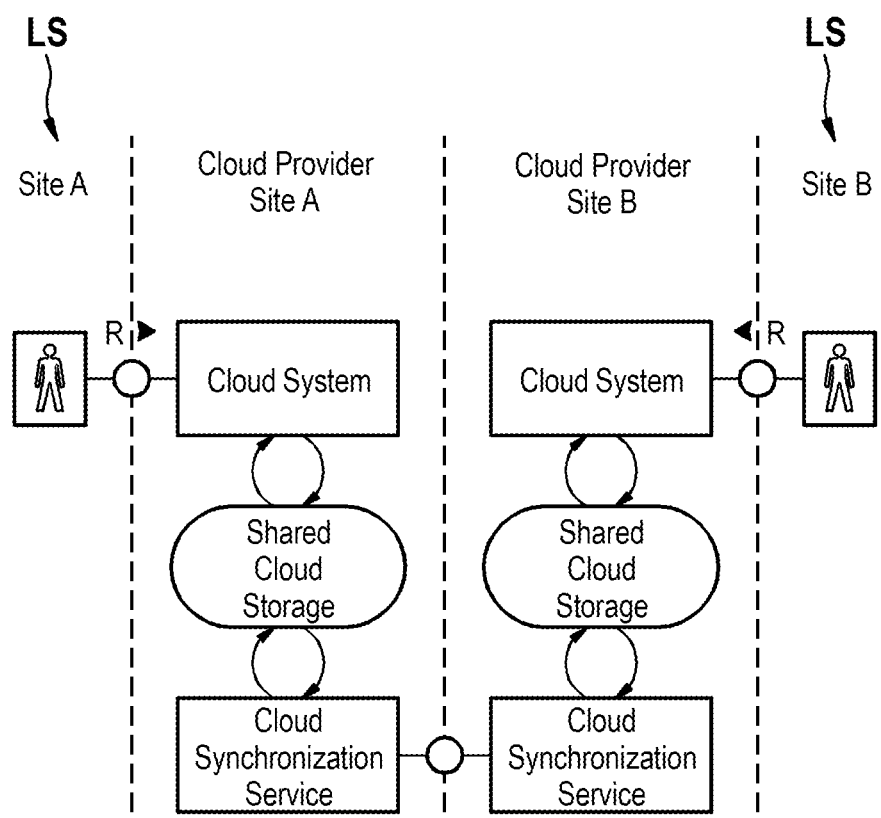
FIG. 3 depicts a state of the art database system with multiple cloud services exchanging data.
Figure 4:
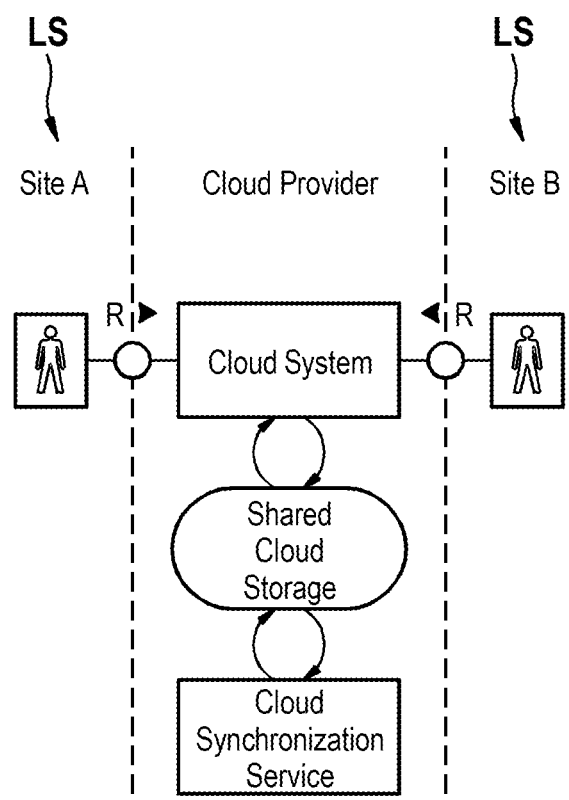
FIG. 4 is a state of the art database system with multiple sites using a hosted application at a single cloud provider.
Figure 5:
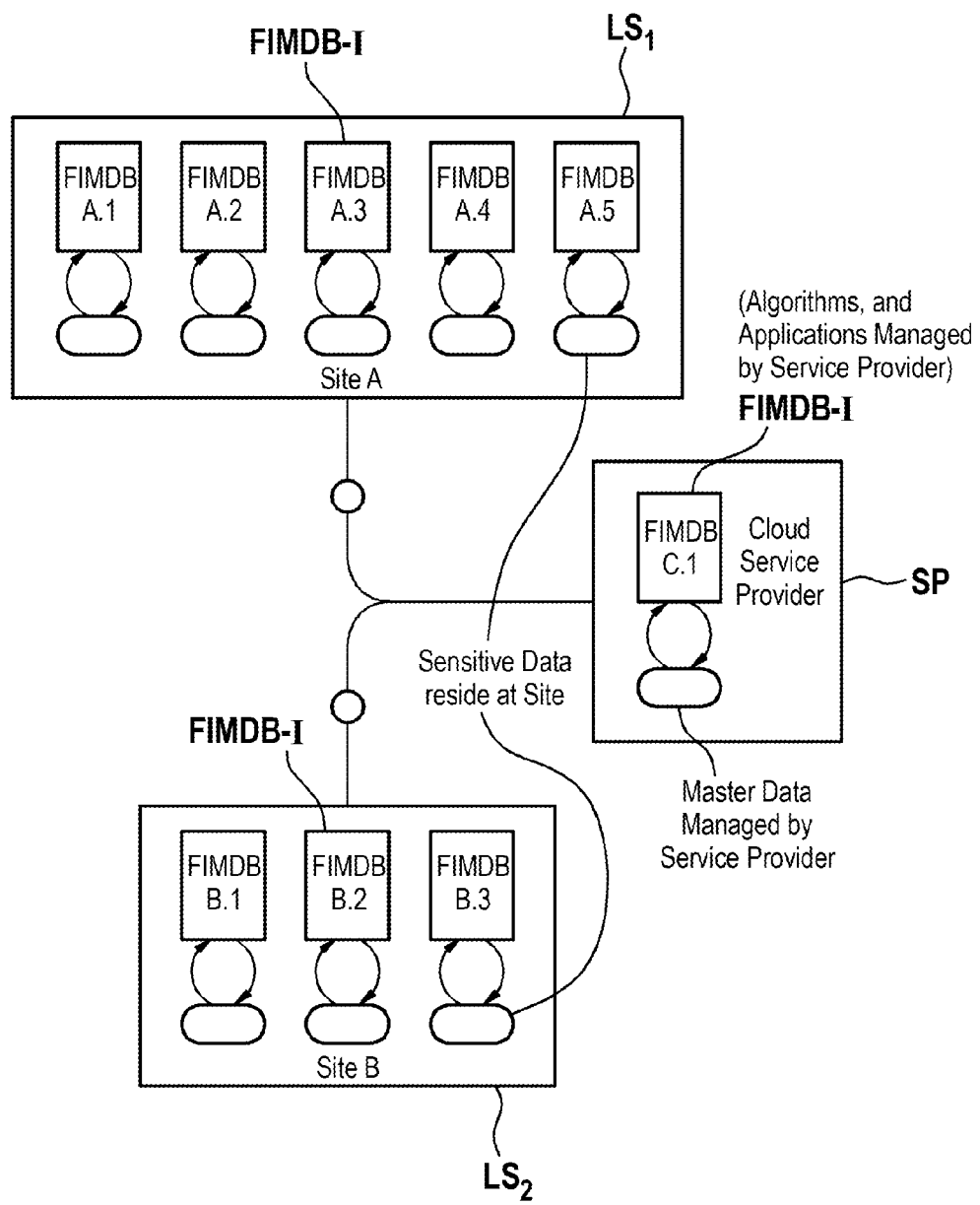
FIG. 5 is an exemplary schematic overview of an embodiment of the present invention, where computing resources and data reside on local sites while the service provider manages algorithms and applications remotely on the central computing infrastructure of the FIMDB system.

FIG. 5 depicts a federated in memory database system (shortly: FIMDB) software architecture according to an embodiment of the invention and modeled as Fundamental Modeling Concepts (FMC) block diagram [3]. It stresses the fact that sensitive data and computing resources are mainly located on local sites and—according to the invention—will not leave the local site for the purpose of dataset processing. All local sites form together the FIMDB system. Compared to all other setups in the state of the art, the FIMDB approach according to the invention does not require any upload of data, which is shown in the application scenario as described in the examples below.

In FIG. 5, the local in memory database instances are referenced with the reference numeral FIMDB-I, because they are already connected with each other in order to build the federated in memory database system. As can be seen, local site $LS_1$ comprises five (5) local in memory database instances FIMDB-I with sensitive data, whereas local site $LS_2$ comprises three (3) local in memory database instances FIMDB-I and the service provider SP has one (1) local in memory database instances FIMDB-I with master data managed by him. The two circles in the connecting lines between the local sites $LS_1$, $LS_2$ and the service provider SP refer to the connection means.

Figure 6:
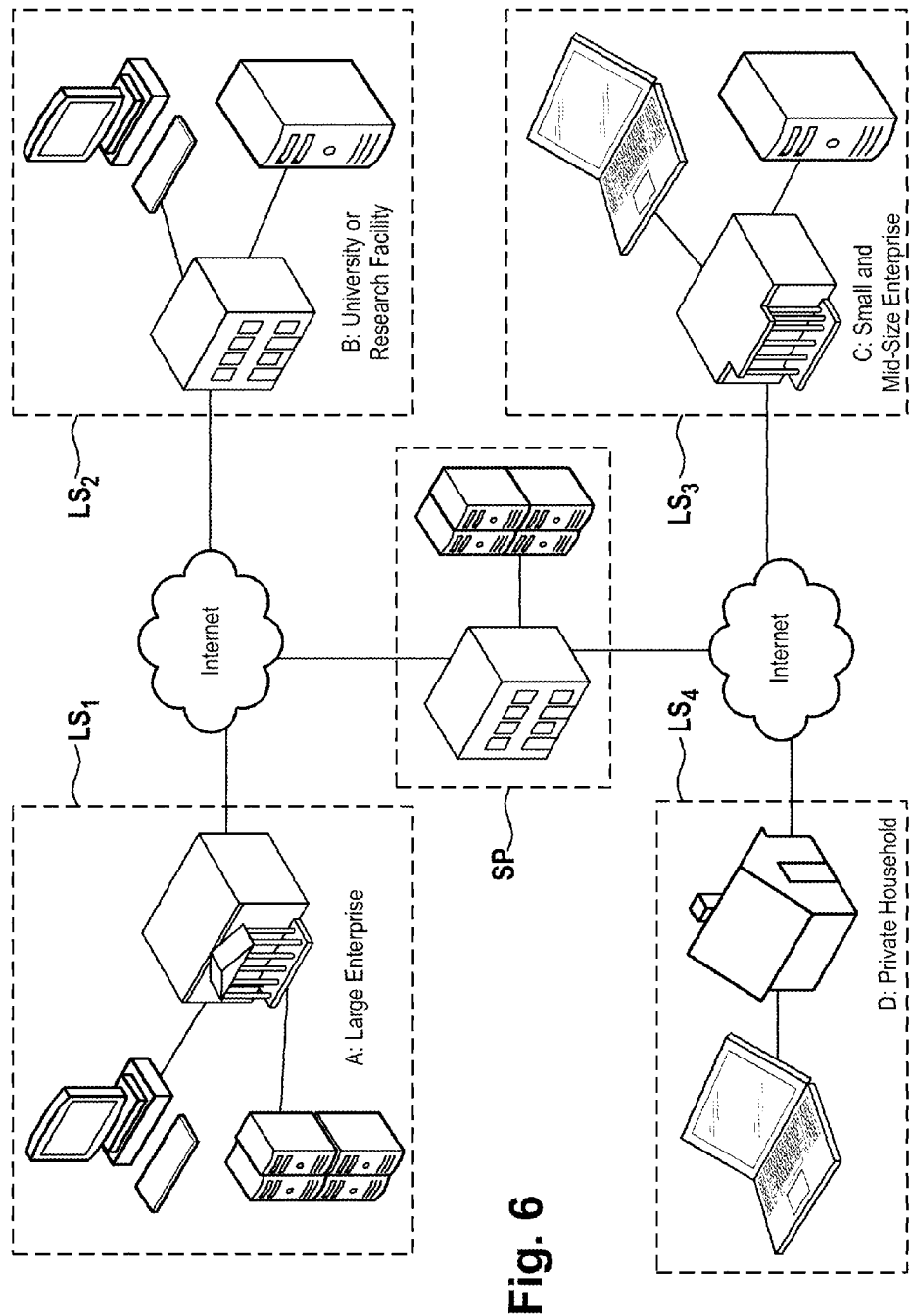
FIG. 6 is a schematic representation of different entities according to an embodiment of the invention with different categories of cloud service users.

Today, cloud computing is often used as a metaphor for consolidation of hardware resources by major public cloud service providers, such as Microsoft, Google, Backspace, and Amazon [6, 7]. To understand the different requirements and perspectives on cloud computing, the following groups of end users consuming cloud services are defined, as depicted in FIG. 6.

A: Large enterprises maintain their existing on-premise server systems LS1 and use cloud computing for outsourcing of selected services that typically do not involve sensitive data, B: Universities or healthcare providers have existing on-premise server systems LS2 but need to consolidate software and hardware across multiple sites, C: Small and Mid-size Enterprises (SMEs) might have limited set of local hardware resources LS3 or outsource specific software services, such as financials, from the beginning, and D: Private households LS4 do not have any server systems on premise and consume cloud services for their private purposes only.

The following table compares the aforementioned user groups of cloud services and their requirements, which can be subsumed in the following categories:

1. Users are characterized by existing on-premise hardware resources, high computing power, a variety of local software applications, and high network bandwidth, e.g. large enterprises, universities, and healthcare providers, and 2. Users are characterized by medium or low local hardware resources, a mix of local and cloud-based applications, and low to medium Internet bandwidths, e.g. SMEs and private households.

The above-mentioned different categories of service consumers have different requirements relating to local and remote hardware, software and/or bandwidth. For example, typically, local sites of category A and B have better or higher resources in hardware and software, compared to local sites of category C and D.

Today, existing cloud services mainly focus on customers of above mentioned category II as well as customers of above mentioned category I, which aim to reduce local hardware, software, and personnel permanently by replacing them or outsourcing existing services to an external provider. However, end users of above mentioned category I with existing hard- and software pools and specific legal restrictions regarding exchange and processing of data are not addressed, yet. In this invention, the focus in the present invention is, thus, on the latter group of end users and how to enable them to benefit from cloud services while integrating existing computing resources and keeping their data on premise.

From an engineering perspective, consolidation of existing hardware resources in data centers, improved use of asset utilization, and near-instantaneous increase and reductions in capacity are obvious benefits of cloud computing [2]. From a business perspective, the Total Costs of Ownership (TCO) are optimized by incorporating cloud computing since the service provider is able to deploy processes and tools that enable management of hundreds or thousands of similar systems at the same time, e.g. to perform regular software updates on all systems in parallel. Cloud computing provides a moderate way of scaling for end users, i.e. they can transparently extend their hardware resources for a selected period of time without the need to have the maximum capacity of required hardware permanently available [8]. For example, consider an online shop of a department house, which needs additional resources during seasonal sales.

A major concern of consumers—private and enterprise equally—to use cloud computing infrastructure is the privacy of their data once moved to the cloud, e.g. accidental disclosure or targeted data mining [9]. For private users, it might be acceptable to move photos, videos, or music to cloud storages since they believe these data only have individual value. For enterprises, it will be a fiasco once confidential data in a cloud storage is accessed by unauthorized persons, e.g. competitors. Although the cloud storages are often maintained at a higher level than local computer resources, it remains still a major concern of end-users [10]. Therefore, large enterprises still prefer to select private cloud solutions to have greater control about asset and data [7]. Though, specific enterprise users are even not allowed to move their data to a data center outside of their company. For example, consider hospitals or healthcare providers dealing with patient data: they are highly restricted in terms of data processing [11].

However, according to the invention a new technical approach is taken, in that cloud computing no longer necessarily involves the outsourcing of local hardware to a service provider. As an advantage, hardware and data may kept locally while benefiting from managed services and improved use of available resources.

In the following, the architecture of our FIMDB system is introduced and explained. The FIMDB approach is driven by the observation that latest medical devices generate more and more fine-grained diagnostic data in a very short period of time. Even with increasingly available network bandwidth, sharing data results in significant latencies due to data duplication when following state-of-the-art approaches as outlined above during the discussion of state of the art systems. Thus, the invention focuses on enabling a sharing of data between (i.e. research) sites without the need for data duplication.

Today, medical data has becomes more and more available in digital formats, e.g. laboratory results, personal genomic data or Electronic Health Records (EHR) [12]. As a result, sharing these data between individual experts and integrating specialized systems is the foundation for discovery of new medical insights [13]. However, personal data requires very specific handling and exchange is limited, e.g. due to legal and privacy regulations, such as the Data Protection Directive of the European Union [14]. The collaboration of international life science research centers and hospitals all over the globe is important to support the finding of new scientific insights, e.g. by sharing of selected knowledge about existing patient cases. However, collaborations face today various IT challenges, such as compatibility, controlled data exchange, and privacy requirements of patient data.

In one embodiment of the present invention, a clinician needs to decide on the optimal chemotherapy for a tumor patient once the tumor has been removed. Therefore, the clinician orders whole genome sequencing of the tumor sample to identify driver mutations. The tumor sample is sent to the pathology department of the hospital to perform the wet lab work. Data acquired from NGS devices result in up to 750 GB of raw data per single patient, which requires data pre-processing steps, such as alignment of chunks to a reference and variant calling, prior to its use in context of clinical decision support [15]. The latter requires dedicated bioinformatics expertise, hardware and software expertise, and trained staff on site, which results in additional costs for hospitals. A cloud service provider SP instead of the local department of pathology LS1 can provide tools for data processing and analysis, trained staff, and required computing infrastructure in a more efficient way by offering the same service to multiple client sites LS.

When considering an exclusively available 1 Gb network connection between the local site LS and the cloud service provider SP and a payload bandwidth ratio of 75%, it consumes 8,000 s or approx. 2 h 14 m to transfer the data from the local site to the cloud service before any processing can start.

The FIMDB system according to the invention builds on the observation that if time for transferring data exceeds the execution time of the algorithms by far, it might be more efficient to transfer the algorithms to the local site and to perform the processing on the locally available data instead. As a result, time for data transfer is reduced since only the algorithms need to be transferred, which is typically orders of magnitudes smaller in size than the data to be processed. Examples for algorithms are alignment and variant calling tools, which are in fact in the size of some MB instead of hundreds of GB for the considered real-world example, e.g. 14 MB for GATK 3.1.1 variant calling algorithm are exchanged within approx. 0.15 s.

The invention is based on the technical architectural concept of transferring algorithms instead of data without conflicting with the idea of sharing data. The term "data sharing" is defined as the process of granting access to a unique data set without the need to replicate it, i.e. sharing does not involve copying. Eliminating the need for data replication comes with the following process advantages, which are especially important when dealing with big medical data sets:

No latency due to transfer of data to computing resources since data resides locally, Minimal storage requirements since no redundant data needs to be maintained, and No need to synchronize changes as all changes are applied directly to the original data set.

In the following, data will be distinguished in regard to their privacy as patient and master data. Patient data subsumes all kinds of personal data referring to an individual, e.g. name, birth date or personal genome, which involve specific steps to guarantee privacy. In contrast, master data refers to all kinds of sharable data required for various data operations, e.g. disease classifications, publications, or generic genomic annotations.

Based on this classification, patient data is considered as sensitive data that needs to reside at their current locations, e.g. at the local hospital site, to comply with privacy regulations. In contrast, master data will be managed at a central site to optimize maintenance, but can also be shared across and accessed by various sites, e.g. the genome annotations that can be incorporated to perform local genome data analysis.

In the following, the terms customer and service provider SP are used. A customer is to be construed as the computer system of a user of a service, provided by a service provider SP. A customer may also be referred to as client or local site LS. Examples for customers are hospitals or research sites while central computing or bioinformatics centers are examples for service providers SP.

Cloud-based infrastructures also offer managed services, e.g. which are hosted, configured and maintained by the service provider software is handled by the service provider SP [8]. Providing access to managed services requires the isolation of customer-specific data, e.g. the execution details of specific genome data analyses. However, since patient data are not copied to the service provider there is no need for additional data privacy and security requirements.

With regards to complexity of genome data processing and analysis, the advantages of hosted services should also be available for a federated system. As a result, the provision of managed services is considered as an integral aspect for a next-generation genome data processing and analysis platform [16]. The service provider SP of the managed services has the required expertise in bioinformatics, software engineering as well as access to infrastructure and hosting structures. Thus, the service provider SP manages:

a) Algorithms required to process (medical or other application) data and
b) Maintains all master data incorporated by these algorithms at a central site.

A customer accesses the managed service of the service provider SP, e.g. a web application provided via an internal web page. The customer uses its specific credentials to logon to guarantee its authenticity and to protect customer-specific data and results. The service provider SP manages the web application and the logon, i.e. no local hardware is incorporated for these steps.

Depending on the purpose of the application, the customer needs to specify additional input data, e.g. local patient data. Considering the aforementioned NGS use case, the clinical experts wants to process the raw NGS data generated by the sequencing device at the department of pathology. The clinical experts will create a new task in the cloud application for NGS data processing hosted by the service provider. The reference genome and genetic annotation data are considered as master data, which are managed by the service provider SP directly. The patient-specific NGS data obtained from the tumor sample is considered as patient data and must reside at the local site LS, i.e. the server of the department of pathology.

Processing of patient-specific, sensible data is performed in a distributed manner, i.e. on the local hardware provided by the department of pathology in this embodiment. It is also referred to as local hardware whereas the infrastructure physically hosted at the service provider is referred to as remote hardware. As a result, local hardware needs to be provided and configured to connect to the hosted application provided by the service provider SP. The local hardware form together with the hardware of the service provider SP and additional partner sites an FIMDB system, which might also involve multiple distributed sites connected to a single infrastructure provided by a service provider SP.

The local hard- and software needs to be configured once to connect to the existing federated system. For connecting local and remote hardware, existing infrastructure components, such as Virtual Private Network (VPN), are incorporated. In addition, selected applications need to be configured once, e.g. to use master data provided by the service provider SP for locally executed algorithms. Master data are shared using existing infrastructure options, e.g. Common Internet File System (CIFS), Server Message Block (SMB), or Network File System (NFS).

The following steps are required to interconnect multiple local sites to form a federated system once during setup phase:

Setup a VPN connection on the local site to form a site-to-site connection with the service provider [17], in particular by means of the connection means LSG
Configure the local services directory exposed by the managed services provider, which contains all algorithms managed by the service provider for execution on local data,
Install local IMDB instances and join them to the FIDMB system,
Subscribe to one of the provider's services and configure user accounts and access groups, and
Configure selected service settings, e.g. home directory of created users at local site.

The following steps are performed multiple times depending on the application:

The user logs on to the managed service, e.g. by opening her/his web browser, navigating to web application, and logging in with her/his personal credentials,
Perform application-specific configuration, e.g. select FASTQ files to perform alignment and variant calling on the user's home directory at the local site,
Trigger execution of application, e.g. submit request to process local files, and
Investigate results using managed service, e.g. use genome browser application to analyze variants detected during variant calling.

Thus, there are two time phases: a first definition phase for set up and a later application phase, during which the application(s) is (are) executed.

In the following, required steps for setup and configuration of a managed service as defined above (in connection with the explanation of the setup and configuration to access managed services) are outlined using our concrete use case. The given application scenario focuses on the processing and analysis of genome data as a managed service. The data is created at decentralized research sites or sequencing centers LS and must not be transferred to a central site due to legal restrictions for the use of the acquired patient-specific data. However, for assessment of treatment alternatives, the comparison of the concrete patient case with a spectrum of similar patient cases, e.g. similar patient history or identical diagnosis stored at individual partner sites, is required. Both, the research sites and the managed services sites, can consist of multiple computing nodes. In one application scenario, the research site was equipped with 150 computing nodes and the service provider was equipped with 25 high-end computing nodes.

Figure 7:
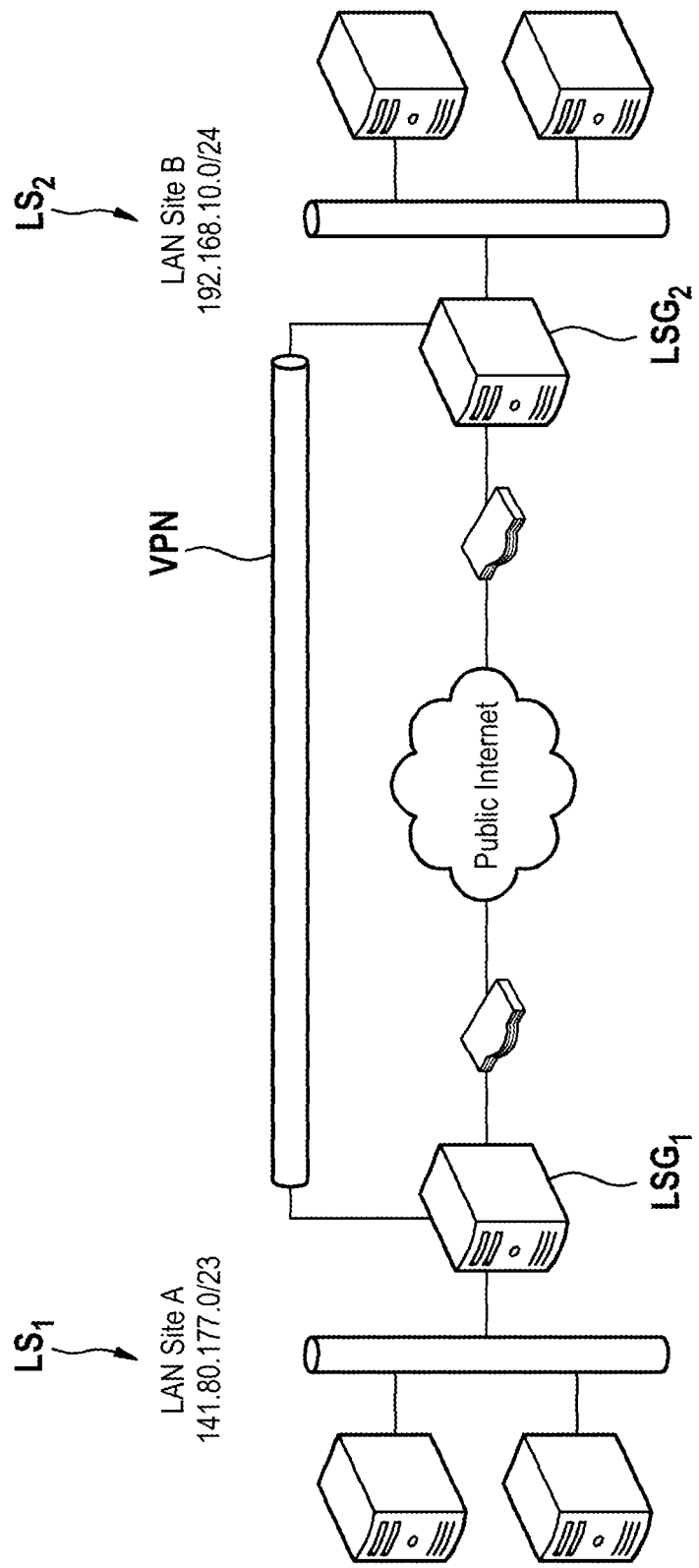
FIG. 7 is a schematic representation of two cloud service users with a site-to-site VPN connection according to an embodiment of the invention.

It is necessary to install and configure the VPN client by means of the connection means LSG. For the application scenario, OpenVPN version 2.3.5 was used and configured to establishing a secured bidirectional site-to-site VPN tunnel. The VPN tunnel connects local area networks at site A and site B via the public Internet as depicted in FIG. 7. In the typical VPN setup multiple VPN clients connect to a corporate network via a single VPN server, i.e. the corporate network is extended and clients consume corporate services in the same way they would access them being physically connected to the corporate network. In contrast, the site-to-site setup connects multiple Local Area Networks (LANs) with each other's, i.e. multiple LANs are connected forming a dedicated virtual network across all network topologies being able to create any kind of point-to-point connections. In the given application scenario, the local research site configured a single system as gateway system for the VPN connection while the updated network routes were pushed to individual computing nodes. Thus, the configuration efforts were minimized while a single point of maintenance was established.

The managed service provider grants access to required algorithms. In the application scenario, the services are either file- or database-based. File-based services, such as the alignment algorithms Burrows Wheeler Aligner (BWA) or Bowtie, are exposed as runtime binaries using a Network File System (NFS) [18, 19]. Thus, the service consumer needs to create a local mount point and add the configuration for automatically mounting the remote service directory to all local computing nodes. In the given scenario, the local sites integrated the configuration in their central configuration scripts, i.e. deployment to all involved nodes was a single step.

Database-based services, e.g. stored procedures or analytical queries, are deployed via the FIMDB system, i.e. they become automatically available once local database instances are connected to the FIMDB landscape. Thus, no dedicated configuration steps are required.

For each local computing node, an individual database instance needs to be installed and configured to connect to the FIMDB landscape. In one embodiment, the SAP HANA version 1.00.82.394270 was incorporated as the in-memory database system in landscape mode to form a distributed database [20]. The required database software is provided via the dedicated remote services directory. Thus, after mounting the services directory, the installation of the local database instance needs to be performed. For minimizing the efforts of installing the database instances, the parameter-based installation is incorporated, i.e. all parameters for the installation were predefined and provided as command parameters, which was executed in parallel across all nodes at the same time using the Linux tool Parallel Distributed SHell (PDSH) version 2.29 [21]. As a result, the required binaries were copied to the local database nodes, the local instances started, and registered online with the SAP HANA master server without any configuration downtime of the FIMDB system. In the concrete use case, the service provider incorporated the SAP HANA Database Lifecycle Manager with the addhosts command [22]:

```
./hdblcm --action=add_hosts
--addhosts=node-01.fsoc,...,node-25.fsoc
--root_user=lmroot --listen_interface=global
```

In the given application scenario of the embodiment, the managed service for processing and analysis of genome data was provided as a web application, which was accessible via any Internet browser. The web application was hosted at the site of the service provider SP and can be accessed by users using the URL of the application. The service provider SP supports either local user accounts or the integration of existing authentication providers, e.g. using OAuth 2.0, for authentication [23].

Client: The application administrator of the research site LS subscribes to the managed services for the entire site or research department and access is granted to administer the application and settings. She/he is responsible to maintain user groups and access rights for users of the research site within the application. The mapping of application users to corresponding database users and roles is performed by the application administrator while the service provider maintains users and roles in the database.

Figure 8:
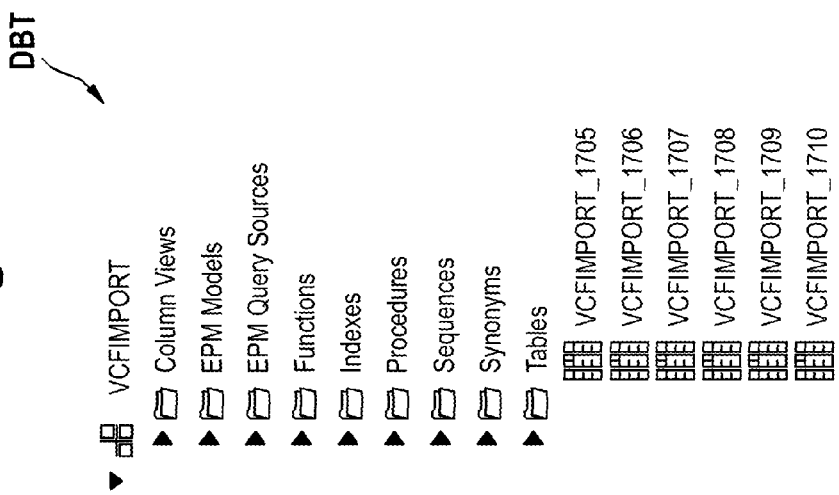
FIG. 8a depicts an example screenshot of a database schema of the FIMDB system, i.e. a group of various data entries, database tables, functions, and procedures.
FIG. 8b shows an example screenshot of selected partitioning details of a database table in the FIMDB, i.e. the physical location of chunks of data.

Service Provider: The service provider SP defines a dedicated database schema per site. A database schema is a container for a set of database tables DBT, functions, and stored procedures as depicted in FIG. 8a. Each database schema is kept isolated, i.e. tenant-specific data is separated to ensure data privacy [24]. The database administrator maintains specific user roles per tenant and grants them access to their tenant-specific database schemes. Each database schema is partitioned across a tenant-specific resource set, i.e. a local subset of the overall computing nodes, which are used for storing and processing the data. The database administrator can update the list of computing nodes online without interfering running operations, i.e. data is repartitioned without any database downtime. Furthermore, the FIMDB administrator can assign additional resources to a resource set, e.g. to ensure scalability by adding resources of the service provider SP. FIG. 8b depicts selected details of a database table DBT partitioned across the FIMDB. For example, the first line describes that database table chunk 16, which has a cardinality of 85,286 entries and a size of 2.6 MB, is stored on the computing resource named node-01.

The user of the research site accesses the managed service using the URL of the web application. The web application is accessed via the VPN connection, i.e. all data is exchanged via the secured tunnel. The end user is able to maintain her/his personal profile and configure application settings. In the application scenario, each end user was able to define her/his local home directory, which contains all genome data they were working on.

Figure 9:
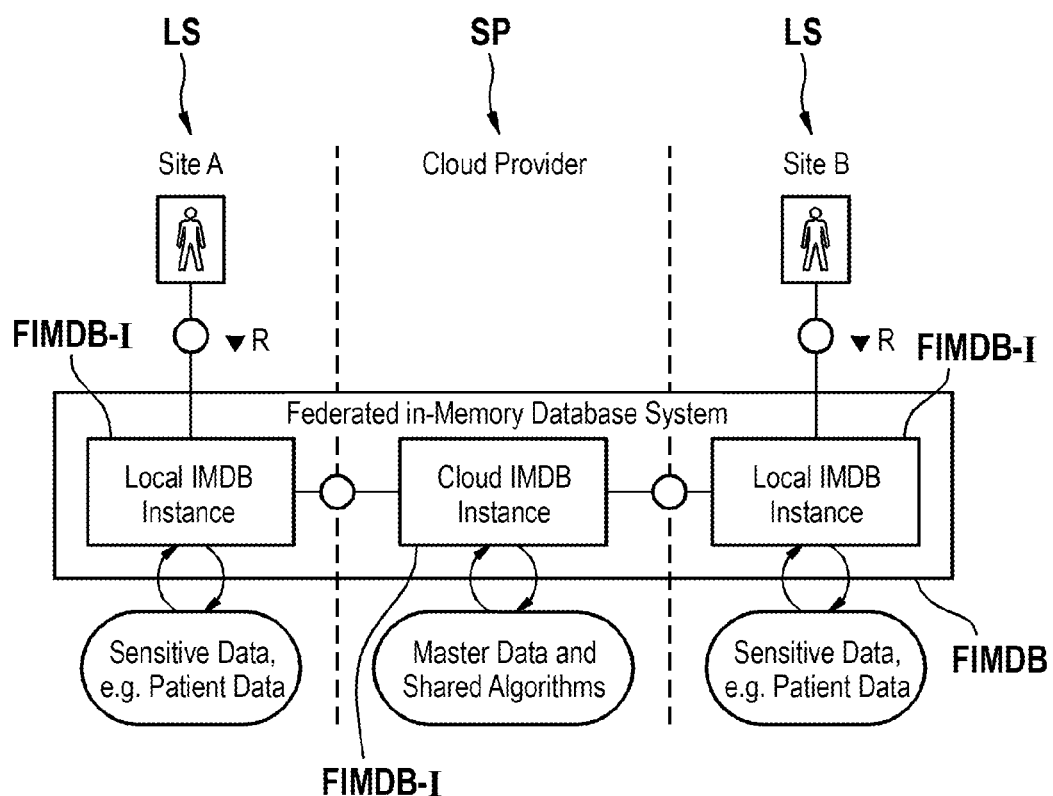
FIG. 9 shows multiple sites forming an FIMDB by interconnecting their local database instances according to an embodiment of the present invention.

Compared to state of the art architectures, as described above in connection with FIGS. 1 to 4, the new architecture according to the present invention is depicted in FIG. 9.

In state of the art systems, at least one single data upload to the central cloud system is required when using a single cloud provider as discussed in the in the description of related art, above. The FIMDB system according to the present invention eliminates even this single data transfer to the cloud (the central service provider SP) by directly importing acquired data into the local database instance FIMDB-I as depicted in FIG. 9. By interconnecting all local database instances and configuring data privacy and access rights, they form the FIMDB system. When incorporating the federated in memory database system (FIMDB), there is no need to upload data via the Internet connection to the central cloud provider SP for further processing. Instead, the required algorithms and methods are either downloaded from the service directory, e.g. software directly executed by the operating system (OS), or acquired from the FIMDB instance, e.g. stored database procedures of the service provider SP. For the distributed execution of the required algorithms and management of the results, a worker framework is incorporated. The worker framework is a dedicated execution environment for the IMDB system, which enables the execution of arbitrary programs either by the operating system or database internally [16]. As a result, the FIMDB system eliminates the need to transfer data prior to its processing, exchanges only the smaller fraction of data, i.e. the algorithms, and offers full control over sensitive data by keeping them only on the local site where acquired.

Figure 10:
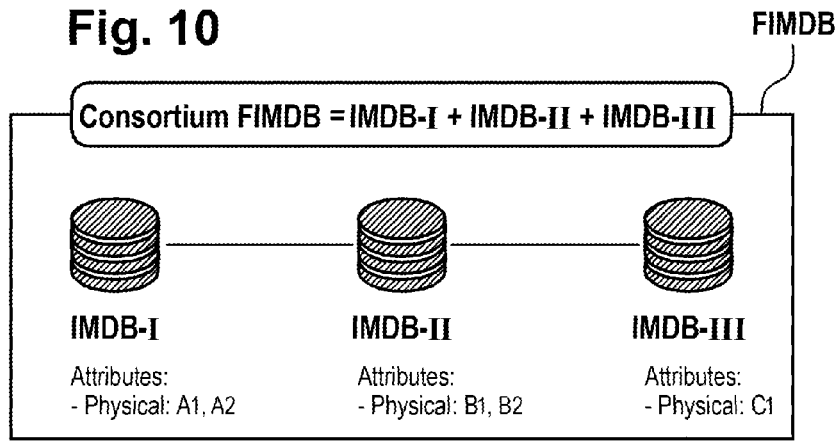
FIG. 10 shows a spanned FIMDB configuration according to an embodiment of the present invention using multiple local IMDB instances to form a FIMDB.
Figure 11:
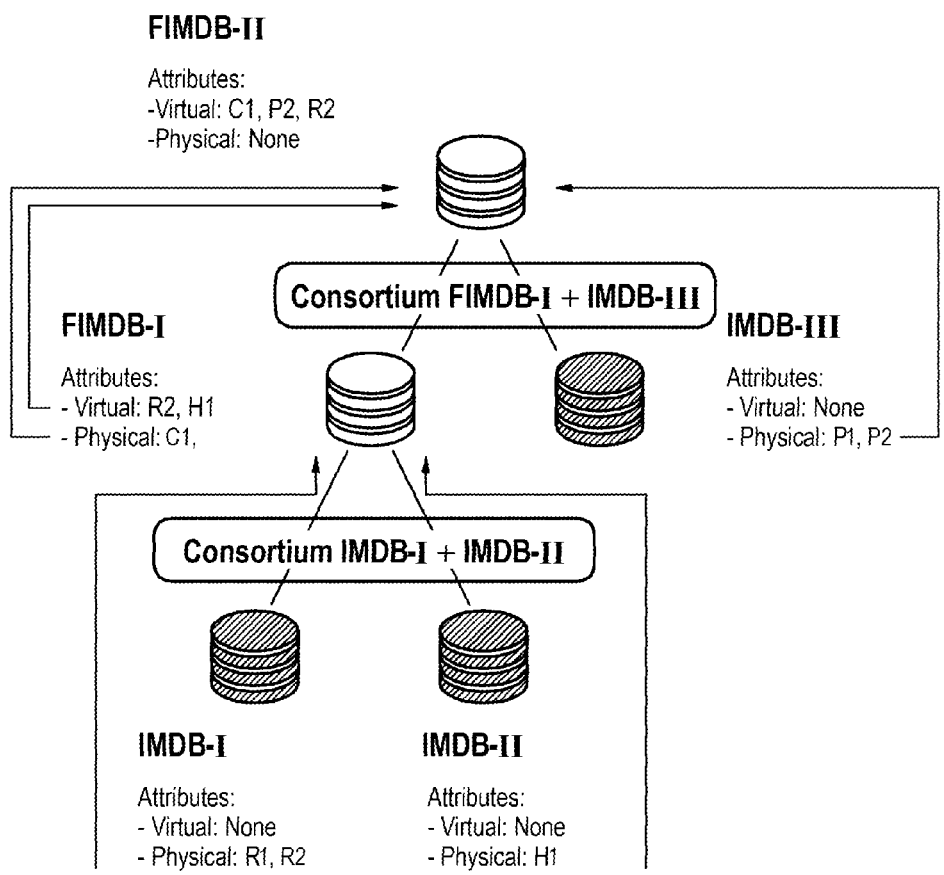
FIG. 11 shows a hierarchical FIMDB configuration according to an embodiment of the present invention using a hierarchy of local IMDB interconnected as a tree of databases to form a FIMDB.

With reference to FIG. 10 and FIG. 11 individual system architecture setups for a federated in-memory database are defined. In the following, two selected architectures are outlined: a so called spanned FIMDB and a hierarchical FIMDB.

The spanned FIMDB follows the concept of forming a FIMDB spanned across various IMDB instances. Each of the IMDB instances can be located either at one or multiple sites. Forming the federated in memory database system FIMDB is achieved by establishing interconnection between individual database instances IMDB-I, e.g. configuring a VPN connection between them. The availability of all in memory database instances IMDB-I is required to guarantee the operation of the federated in memory database system FIMDB. A dedicated database operator is responsible to manage all individual IMDB instances IMDB-I regardless from the physical location. Hot-standby and replication can be configured so that data is distributed also across individual physical locations. In case of a network segmentation, each database can be operated individually, but only the subset of data stored on instances IMDB-I within the same segment remains accessible during segmentation. FIG. 10 depicts a spanned federated in memory database system FIMDB setup consisting of local database instances IMDB-I, IMDB-II, IMDB-III forming the federated in memory database system FIMDB. Each of the involved local database instances IMDB contains private data, e.g. attributes A1 and A2 are physically stored in database instance IMDB-I. From the user's perspective, the federated in memory database system FIMDB is a single database system. Queries are forwarded for processing to the corresponding local database system IMDB, holding relevant data.

The hierarchical federated in memory database system FIMDB will be explained with reference to FIG. 11 and follows the concept of forming a federated database by integrating local database instances IMDB using a hierarchical, in particular a tree-based approach. Leaves within this conceptual tree are local database instances IMDB whilst nodes are forming individual federated in memory database systems FIMDB. All IMDB instances contain physically stored data only. The federated in memory database system FIMDB can either be virtual or mixed. Virtual FIMDB do not store any data physically expect for their individual configuration data. However, virtual FIMDB can access data exposed by IMDB or FIMDB instances whilst they remain physically stored at their original systems. In addition to virtual FIMDB, mixed FIMDB contain also data, which is stored physically in it. FIG. 11 depicts in memory database system systems IMDB-I, IMDB-II, IMDB-III which are represented in a dotted manner in FIG. 11 as dotted leaves and the federated in memory database systems FIMDB-I and FIMDB-II are represented in FIG. 11 as white nodes in the hierarchical tree-structure. The configuration is not limited to use a binary tree, i.e. an arbitrary number of database instances IMDB, FIMDB can be connected via a single federated in memory database system FIMDB. In FIG. 11, database FIMD-I is a mixed hierarchical federated in memory database system FIMDB, which provides the virtual attributes R2, exposed by database instance IMDB-I and the attribute H1, exposed by database instance IMDB-II. In addition, database instance FIMDB-I contains the attribute C1, which is physically stored in database FIMDB-I. Database FIMDB-II is a virtual database FIMDB, providing access to data of databases FIMDB-I, IMDB III. For example, consider a research consortium Alpha to cooperate on a certain research project. R2 is data provided by a research lab, H1 is data provided by a hospital, while C1 is data created by the research consortium. Another research consortium Beta uses data provided by research consortium Alpha in federated database FIMDB-I and data provided by another partner in database IMDB-III.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

REFERENCE NUMERAL

LS Local Site
SP Service Provider for managed services
FIMDB Federated In-Memory Database
IMDB (local) In-Memory Database
FIMDB-I Federated In-Memory Database Instance
LSG Connection means, in particular Local Site's Gateway
VPN Virtual Private Network Connection
DTB Database Table
CM Configuration Means

REFERENCES

[1] Q. Zhang, L. Cheng, and R. Boutaba, "Cloud Computing: State-of-the-art and Research Challenges," Journal of Internet Services and Applications, vol. 1, no. 1, pp. 7-18, 2010.
[2] V. Kundra, "Federal Cloud Computing Strategy," http://www.whitehouse.gov/sites/default/files/omb/assets/egov\s\do5(d)ocs/federal-cloud-computing-strategy.pdf (last accessed: Dec. 16, 2014), February 2011.
[3] A. Knöpfel, B. Grone, and P. Tabeling, Fundamental Modeling Concepts: Effective Communication of IT Systems. John Wiley & Sons, 2006.
[4] National Institute of Standards and Technology, "The NIST Definition of Cloud Computing: Recommendations of the National Institute of Standards and Technology," NIST Special Publication 800-145, September 2011.
[5] Gartner, Inc., "2014 Hype Cycle for Emerging Technologies Maps the Journey to Digital Business," http://www.gartner.com/newsroom/id/2819918 (last accessed: Dec. 16, 2014), August 2014.
[6] S. Srinivasan, "Cloud Computing Evolution," in Cloud Computing Basics. Springer, 2014, pp. 1-16.
[7] Everest Global, Inc., "Enterprise Cloud Adoption Survey," http://www.everestgrp.com/wp-content/uploads/2014/03/2014-Enterprise-Cloud-Adoption-Survey.pdf (last accessed: Dec. 16, 2014), March 2014.
[8] M. Armbrust et al., "A View of Cloud Computing," Commun. ACM, vol. 53, no. 4, pp. 50-58, April 2010.
[9] M. D. Ryan, "Cloud Computing Privacy Concerns on Our Doorstep," Commun. ACM, vol. 54, no. 1, pp. 36-38, January 2011.
[10] C. Kalloniatis et al., "Migrating Into the Cloud: Identifying the Major Security and Privacy Concerns," IFIP Adv in Inform and Commun Tech, vol. 399, pp. 73-87, 2013.
[11] P. B. Jensen, L. J. Jensen, and S. Brunak, "Mining Electronic Health Records: Towards Better Research Applications and Clinical Care," Nature Rev Genet, vol. 13, no. 6, pp. 395-405, 2012.
[12] P. Wicks et al., "Sharing Health Data for Better Outcomes on PatientsLikeMe," Journal Med Internet Res, vol. 12, no. 2, p. e19, June 2010.
[13] R. Fears et al., "Data Protection Regulation and the Promotion of Health Research: Getting the Balance Right," QJM, vol. 107, no. 1, pp. 3-5, January 2013.
[14] M.-P. Schapranow et al., "In-Memory Computing Enabling Real-time Genome Data Analysis," Int'l Journal On Advances in Life Sciences, vol. 6, no. 1 and 2, pp. 11-29, 2014.
[15] H. Plattner and M.-P. Schapranow, Eds., High-Performance In-Memory Genome Data Analysis: How In-Memory Database Technology Accelerates Personalized Medicine. Springer-Verlag, 2014.
[16] OpenVPN Technologies, Inc., "Site-to-Site Layer 3 Routing Using OpenVPN Access Server and a Linux Gateway Client," https://docs.openvpn.net/(last accessed: Dec. 16, 2014), February 2012.
[17] H. Li and R. Durbin, "Fast and Accurate Short Read Alignment with Burrows-Wheeler Transformation," Bioinform, vol. 25, pp. 1754-1760, 2009.

[18] S. S. Langmead B, "Fast Gapped Read Alignment with Bowtie 2," Nature Methods, vol. 9, no. 357-359, 2012.
[19] F. Farber et al., "SAP HANA Database: Data Management for Modern Business Applications," SIGMOD Rec., vol. 40, no. 4, pp. 45-51, January 2012.
[20] M. A. Grondona, "Parallel Distributed Shell (PDSH)," https://code.google.com/p/pdsh/wiki/UsingPDSH (last accessed: Dec. 16, 2014), August 2011.
[21] SAP SE, "Add Hosts Using the Command-Line Interface," http://help.sap.com/saphelps\do\(h)anaplatform/helpdata/en/0d/9fe701e2214e98ad4f8721f65 58c34/content.htm (last accessed: Dec. 16, 2014), 2014.
[22] D. Hardt, "RFC6749: The OAuth 2.0 Authorization Framework," http://tools.ietf.org/html/rfc6749/(last accessed: Dec. 16, 2014), October 2012.
[23] J. Schaffner, Multi Tenancy for Cloud-Based In-Memory Column Databases: Workload Management and Data Placement. Springer, 2014.

The invention claimed is:

1. A federated in-memory database computing system (FIMDB) comprising:
   a plurality of interconnected local computing sites (LS), each installed with a local in-memory database instance (IMDB), which is configured to connect to the Federated In-Memory Database computing system (FIMDB);
   a central computing infrastructure, provided by a service provider (SP), that grants access to the local computing sites and to managed services that are managed by the service provider (SP), and that operates the local computing sites (LS) for execution on local data of each of the respective local computing sites (LS), wherein at least one of the service provider's managed services are subscribed to;
   a remote service directory that is exposed by the service provider (SP) and that is configured and automatically mounted to all of the local computing sites;
   one or more communication channels ($LSG_1$, $LSG_2$), that connects local and remote computing sites of the federated in-memory database computing system (FIMDB);
   a configuration adjuster (CM), that configures hardware and software of the local computing sites (LS) and grants access to algorithms of the managed services, to be executed on the local computing sites (LS) in order to access services managed and operated by the service provider (SP) and execute them on the local computing hardware so that site-specific sensitive data of the local computing sites (LS) is stored and processed only locally and does not leave the local computing sites (LS), whereas sharable master data is processed and managed centrally by the service provider (SP).

2. System according to claim 1, wherein the federated in-memory database computing system (FIMDB), in particular the FIMDB sites, comprise multiple computing sites, including local computing sites of the local sites (LS) as well as the computing sites of the central service provider (SP).

3. System according to claim 1, wherein the central computing infrastructure comprises multiple computing sites.

4. System according to claim 1, wherein the local in-memory database instance is installed and configured on each of the local computing sites (LS) to connect to the federated in-memory database computing system (FIMDB).

5. System according to claim 1, wherein the service provider (SP) provides managed services, amongst others but not limited to the field of bioinformatics and in particular for processing and analysis of genome data.

6. System according to proceeding claim 5, wherein the managed services may include amongst others but not limited to algorithms for performing alignment of genome data, variant calling, and analysis of genetic variants.

7. System according to claim 1, wherein the federated in-memory database system (FIMDB) is a distributed in-memory database and in particular a SAP HANA in-memory database.

8. Service Provider (SP) to be operated in a federated in-memory database computing system (FIMDB) according to claim 1, providing a central computing infrastructure, who grants access to services, managed by the service provider (SP) for execution on local data of a plurality of remote, local computing sites (LS).

9. A computing site (LS) to be operated in a federated in-memory database computing system (FIMDB) according to claim 1, wherein the computing site (LS) is interconnected with a plurality of other remote computing sites (LS), each installed with a local In-Memory Database (IMDB) instance, which is configured to connect to the federated in-memory database computing system (FIMDB).

10. Method for providing and operating a federated in-memory database computing system (FIMDB), comprising the following steps:
    providing a plurality of multiple local computing sites (LS);
    providing managed services by a service provider (SP) to be consumed by local computing sites (LS);
    connecting the local computing sites (LS) to the service provider (SP) and thus enabling the local computing sites (LS) to interchange data with each other as well;
    configuring a remote service directory, exposed by the service provider (SP), and automatically mounting the remote service directory to all local computing sites (LS);
    installing local in-memory database instances and configure them to join the federated in-memory database computing system (FIMDB);
    subscribing to at least one of the service provider's managed services;
    configuring the subscribed managed services at the local computing site (LS) for use by local users;
    configuring hardware and software of the local computing sites (LS) with a configuration adjuster in order to access services managed by the service provider (SP) and execute them on the local computing hardware;
    granting access by the service provider (SP) to the local computing sites (LS) and to algorithms of the managed services operated by the service provider (SP), to be executed on the local computing sites (LS) so that site-specific sensitive data of the local computing sites (LS) is stored and processed only locally and does not leave the local computing sites (LS), whereas sharable master data is processed and managed centrally by the service provider (SP).

11. Method for providing and operating a federated in-memory database computing system (FIMDB), according to claim 10, wherein the FIMDB is provided.

12. Method for providing and operating a federated in-memory database computing system (FIMDB) according to claim 11 wherein the FIMDB is operated.

13. Method according to claim 10, wherein accessing a managed service is performed by accessing a link of a web application provided by the service provider (SP) on the local computing site (LS) by local users.

14. Method according to claim 12, wherein accessing a managed service is performed by accessing a link of a web application provided by the service provider (SP) on the local computing site (LS) by local users.

15. Method according to claim 10, wherein the service provider (SP) operates managed services so that sensitive data of the respective local computing site (LS) is only processed locally and site-specific sensitive data does not leave the local computing site (LS), whereas sharable master data is processed and managed centrally.

16. Method according to claim 12, wherein the service provider (SP) operates managed services so that sensitive data of the respective local computing site (LS) is only processed locally and site-specific sensitive data does not leave the local computing site (LS), whereas sharable master data is processed and managed centrally.

17. Method according to claim 10, wherein required software, including algorithms, selected application data, including master data, and processes for processing data are downloaded from a service directory managed by the service provider (SP) so that the software is directly executed by an operating system of the local computing site (LS).

18. Method according to claim 12, wherein required software, including algorithms, selected application data, including master data, and processes for processing data are downloaded from a service directory managed by the service provider (SP) so that the software is directly executed by an operating system of the local computing site (LS).

19. Method according to claim 11, wherein required software, including algorithms, selected application data, including master data, and processes for processing data is acquired from the installed local in-memory database instance (IMDB-I).

20. Method according to claim 11, wherein local computing sites (LS) grant access to local sensitive data for selected other sites participating in the federated in-memory database computing system (FIMDB).

21. Method according to claim 11, wherein remote sites may be granted access to local data on the respective local site (LS) and wherein the local site (LS) can provide algorithms and processes for processing data on the data locally without duplicating, replicating, moving and/or copying data to the remote site.

22. Method according to claim 10, where any access to local data is permanently documented to form a complete history of exposed data items for data processing.

23. Method according to claim 12, where any access to local data is permanently documented to form a complete history of exposed data items for data processing.

24. Method according to claim 11, wherein the federated in-memory database computing system (FIMDB) is provided by integrating in-memory database instances using a hierarchical structure, in particular a tree-based structure, where nodes of the tree are forming individual federated in-memory databases (FIMDB-I) and leaves are forming in-memory database instances (IMDB-I).

\* \* \* \* \*